United States Patent [19]

Kotzin et al.

[11] Patent Number: 4,979,188

[45] Date of Patent: Dec. 18, 1990

[54] SPECTRALLY EFFICIENT METHOD FOR COMMUNICATING AN INFORMATION SIGNAL

[75] Inventors: Michael D. Kotzin, Buffalo Grove; Anthony P. van den Heuvel, Arlington Heights; Kenneth J. Crisler, Wheaton; Bradley M. Hiben, Glen Ellyn; Lawrence M. Mohl, Hoffman Estates; Mark R. Poulin, Forest Park, all of Ill.

[73] Assignee: Motorola, Inc., Schaumburg, Ill.

[21] Appl. No.: 187,685

[22] Filed: Apr. 29, 1988

[51] Int. Cl.$^5$ ............................................. H04B 1/10
[52] U.S. Cl. ...................................... 375/34; 380/41; 381/29
[58] Field of Search ....................... 375/25, 27, 34, 38, 375/102, 122, 26; 370/118; 381/29, 30, 31; 380/37, 41, 42, 43

[56] References Cited

U.S. PATENT DOCUMENTS

| | | | |
|---|---|---|---|
| 2,629,017 | 2/1953 | Dahlbom et al. | 179/15 |
| 3,674,939 | 7/1972 | Brooks | 381/29 |
| 3,684,838 | 8/1972 | Kahn | 381/29 |
| 3,875,341 | 4/1975 | Gassmann | 381/29 |
| 4,048,443 | 9/1977 | Crochiere et al. | 179/1 SA |
| 4,086,431 | 4/1978 | Franssen et al. | 381/29 |
| 4,086,435 | 4/1978 | Graupe et al. | 179/1.5 R |
| 4,126,761 | 11/1978 | Graupe et al. | 179/1.5 R |
| 4,216,354 | 8/1980 | Esteban et al. | 179/15.55 R |
| 4,283,602 | 8/1981 | Adams | 380/41 |
| 4,319,082 | 3/1982 | Gilloire et al. | 179/1 SA |
| 4,379,205 | 4/1983 | Wyner | 178/22.10 |
| 4,455,649 | 6/1984 | Esteban et al. | 370/80 |
| 4,464,782 | 8/1984 | Beraud et al. | 381/31 |
| 4,479,213 | 10/1984 | Galand et al. | 370/118 |
| 4,538,234 | 8/1985 | Honda et al. | 381/26 |
| 4,622,680 | 11/1986 | Zinser | 375/122 |
| 4,630,300 | 12/1986 | Kang et al. | 381/31 |
| 4,633,325 | 12/1986 | Usubuchi | 358/260 |
| 4,654,704 | 3/1987 | Lippel | 380/15 |
| 4,692,738 | 9/1987 | Suzuki | 340/347 |
| 4,697,285 | 9/1987 | Nozue | 375/17 |
| 4,704,730 | 11/1987 | Turner et al. | 381/36 |
| 4,707,737 | 11/1987 | Adachi et al. | 375/122 |
| 4,713,809 | 12/1987 | Mizota | 370/97 |
| 4,718,087 | 1/1988 | Papamichalis | 381/34 |
| 4,719,624 | 1/1988 | Bellisio | 370/100 |
| 4,724,420 | 2/1988 | Woodard | 340/347 DA |
| 4,727,414 | 2/1988 | Ranf et al. | 358/30 |

FOREIGN PATENT DOCUMENTS 178608 11/1985 European Pat. Off.

OTHER PUBLICATIONS

Crochiere et al., "A Variable-Band Coding Scheme for Speech Encoding at 4.8 kb/S" Bell System Technical Journal, vol. 56, No. 5, pp. 771–779, 1977.

Crochiere et al., "Digital Coding of Speech in Sub--Bands", Bell System Technical Journal, vol. 55, No. 8, pp. 1069–1085, 1976.

Cox et al., "The Analog Voice Privacy System", I.C.A.S.S.P. 1986, I.E.E.E., pp. 341–344, 1986.

Cosentino et al., "An Efficient Technique for Sample-Masked Voice Transmission", I.E.E.E. Journal on Selected Areas in Communications, vol. SAC-2, No. 3, pp. 426–433, 1984.

Cosentino et al., "Secure Voice-Bandwidth Modem", a paper presented at the Carnahan Conf. on Security Technology, pp. 1–14, 1982.

Diffie et al., "Privacy and Authentication: An Introduction to Cryptography", proceedings of the I.E.E.E., vol. 67, No. 3, pp. 397–427, 1979.

*Primary Examiner*—Benedict V. Safourek
*Assistant Examiner*—Stephen Chin
*Attorney, Agent, or Firm*—Thomas G. Berry; Steven G. Parmelee

[57] ABSTRACT

According to the invention, an information signal, such as a information signal, is sampled, quantized and processed digitally through an information encoder. Digitally processed samples produced by the encoder are modulated onto a communication channel to create channel symbols having a magnitude of modulation proportional to a characteristic of a respective digitally processed sample. Both a radio frequency (RF) transmission embodiment, and a wireline embodiment are provided. In a final aspect of the present invention, encryption is provided to ensure communication privacy.

20 Claims, 12 Drawing Sheets

TABLE 1
FILTER

| | | F2 | F3 | F4 | F5 | F6 | F7 | F8 | F9 | F10 | F11 | 12 |
|---|---|---|---|---|---|---|---|---|---|---|---|---|
| | S1 | 1 | 1 | 1 | 1 | 1 | 0 | 0 | 0 | 0 | 0 | 0 |
| | S2 | 1 | 1 | 1 | 0 | 0 | 1 | 0 | 0 | 0 | 0 | 0 |
| | S3 | 1 | 1 | 1 | 0 | 0 | 0 | 1 | 0 | 0 | 0 | 0 |
| | S4 | 1 | 1 | 1 | 0 | 0 | 0 | 0 | 0 | 0 | 0 | 0 |
| | S5 | 1 | 1 | 0 | 0 | 0 | 1 | 1 | 0 | 0 | 0 | 0 |
| | S6 | 1 | 1 | 1 | 0 | 0 | 0 | 0 | 1 | 0 | 0 | 0 |
| | S7 | 1 | 1 | 0 | 1 | 1 | 0 | 0 | 0 | 0 | 0 | 0 |
| SUMMER | S8 | 1 | 1 | 0 | 0 | 0 | 1 | 0 | 0 | 0 | 0 | 0 |
| | S9 | 1 | 1 | 0 | 0 | 0 | 0 | 1 | 1 | 0 | 0 | 0 |
| | S10 | 1 | 1 | 0 | 0 | 0 | 0 | 0 | 0 | 1 | 1 | 0 |
| | S11 | 1 | 1 | 0 | 0 | 0 | 0 | 0 | 1 | 1 | 0 | 0 |
| | S12 | 1 | 1 | 0 | 0 | 0 | 0 | 0 | 0 | 1 | 1 | 0 |
| | S13 | 1 | 1 | 1 | 0 | 0 | 0 | 0 | 1 | 0 | 0 | 0 |
| | S14 | 0 | 1 | 1 | 1 | 1 | 0 | 0 | 0 | 0 | 0 | 0 |
| | S15 | 1 | 1 | 1 | 0 | 0 | 0 | 0 | 0 | 0 | 1 | 0 |
| | S16 | 1 | 1 | 1 | 0 | 0 | 0 | 0 | 0 | 0 | 0 | 1 |

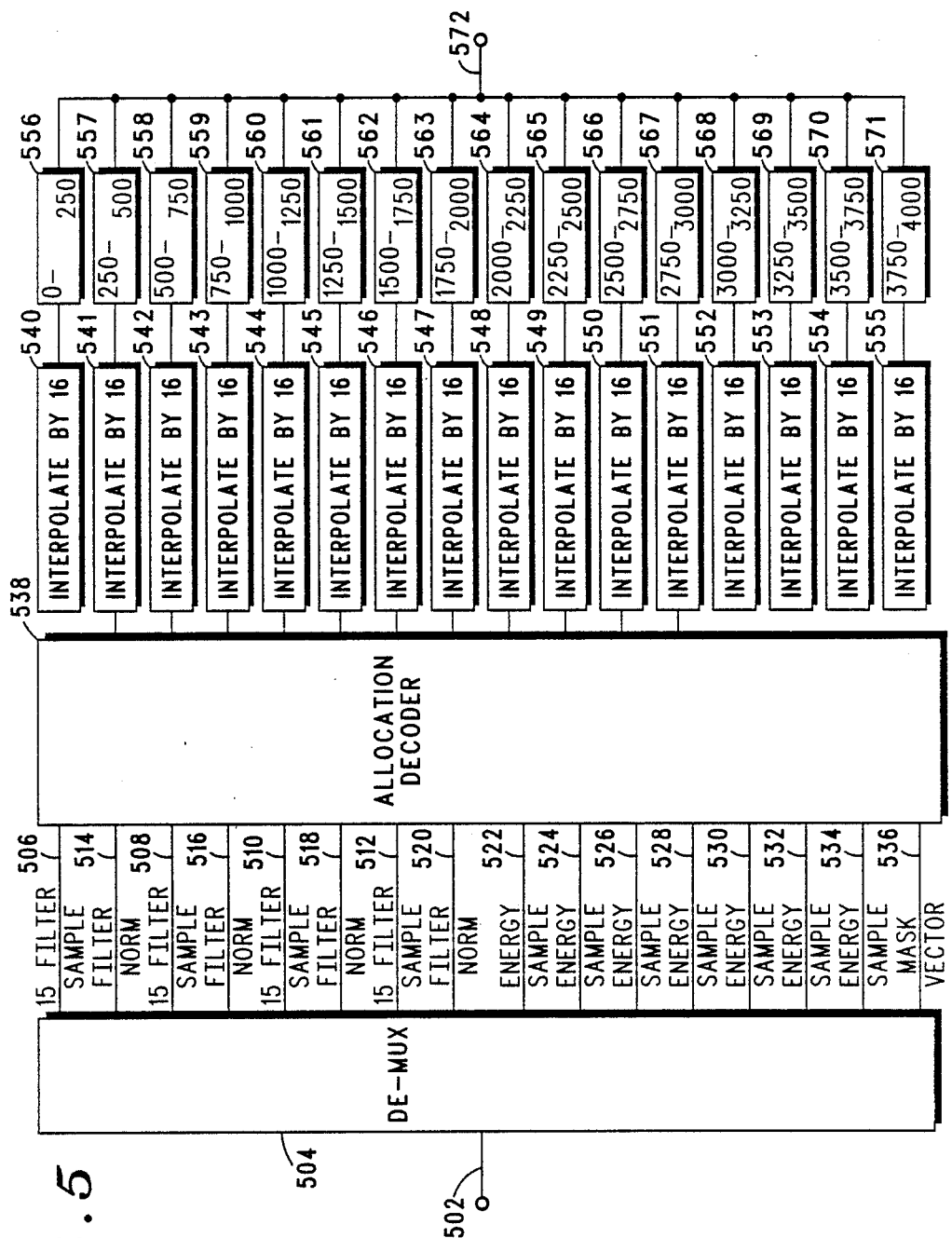

SPECTRALLY EFFICIENT METHOD FOR COMMUNICATING AN INFORMATION SIGNAL

Technical Field

This invention relates generally to the spectrally efficient transmission of information signals, and more specifically to the transmission of information signals that have been processed by information coders, and is more particularly directed toward the spectrally efficient transmission of information processed using sub-band coders.

BACKGROUND ART

Voice coders (vo-coders) are known in the art. Regarding communication systems, the goal of any vo-coder is to encode a speech signal for transmission over a channel. Since communication channels are often quite limited in information carrying capacity (bandwidth), the amount of encoded information required for transmission is preferably minimized. Thus the vo-coding process usually entails compressing the information signal by discarding redundant spectral elements (or other unnecessary information), while retaining only that information that when transmitted to a receiver, allows necessary components to be regenerated (or inferred) thereby permitting the synthesis of a perceptually acceptable recreation of the original speech input. Those skilled in the art will appreciate that a speech signal contains a large amount of redundant or unnecessary information.

Speech production can be modeled as an excitation signal (e.g., sound impulses generated by the vocal cords), driving a filter (e.g., the vocal tract), which possesses a certain resonant structure. The spoken sound changes with time since both the excitation signal and/or filter vary with time. The excitation is noise-like for unvoiced sounds (e.g., consonants), and appears periodic for voice sounds (e.g., vowels). Predominantly, and especially for voiced sounds, most of the essential speech energy is concentrated in only a few frequency sub-bands and these particular frequency bands containing the most energy generally vary slowly over time. It has been found that transmitting only the information contained about these spectral peaks is all that is normally required to provide a reasonable reconstruction of the input speech. This approach forms the basis for the well-known digital adaptive sub-band vo-coder, which attempts to allocate a fixed number of bits among a plurality of spectral sub-bands, such that the accuracy of the reproduction of the speech signal component in the highest energy sub-bands are maximized.

In an effort to minimize the data rate of the vo-coder, systems employing conventional low bit-rate digital coded speech typically exhibit substantial degradation in audio quality from the original speech signal. The users of a radio communication system employing such a coder typically experience this degradation, invariant with the receiver's distance from the transmitting antenna. Thus, regardless of whether the receiver is 25 miles or 25 yards from the transmitter antenna, the achieved audio quality remains essentially fixed so long as there are no bit errors, at which point, further degradation occurs.

Generally, contemporary vo-coder designers advantageously exploit the advantages of digital signal processing, such as, for example, the operational repeatability of digital filters, the immunity of digital circuits to variations due to aging, and the natural invariance of digital circuits to temperature, humidity, vibration, and other adverse conditions. Also, contemporary methods for transmitting information from digital speech coders produces spectral inefficiencies, which can compromise the benefits achieved in removing the redundant speech information. For example, it is known that a high quality analog unprocessed speech signal occupies approximately 4 kHz of bandwidth. After digitization (via pulse code modulation (PCM), the digital representation of this signal has a data rate of 64 kb/s, which occupies approximately 30 kHz of bandwidth (assuming the use of conventional binary channel modulation techniques). Even after considerable processing in a conventional sub-band coder to remove the less important spectral elements (thereby providing moderate audio quality at a rate as low as 10 kb/s), transmission of the speech signal using binary modulation still requires more bandwidth than the original analog signal.

While traditional multi-level modulation techniques (where a channel symbol is used to code more than a single bit) can be utilized to reduce the necessary transmission bandwidth, this is done so at the expense of robustness to channel impairments. It is essential that the reduced (minimized) number of transmitted bits be correctly received. For contemporary low bit rate speech coders, error rates (due to noise or channel fading) of less than one percent may render an unprotected signal unintelligible. In conventional land mobile channels, achieving this low error rate is especially difficult due to multipath fading. Thus, it is common practice to add error coding to the transmitted signal to permit error detection or correction of the bits representing the speech signal. However, the additional coding increases the number of transmitted bits, and therefore further reduces the spectral efficiency of the system. Some designers have attempted to compensate for this detriment by selectively encoding a subset of the transmitted bits.

Therefore, a need exists in the art to provide a method to transmit information that has been processed in a voice coder, that meets the combined communication goals of reliability and maximum spectral efficiency, while providing superior audio quality in the recovered signal.

SUMMARY OF THE INVENTION

Accordingly, it is an object of the present invention to provide an improved communication system.

It is another object of the present invention to provide a reliable yet spectrally efficient communication system.

It is a further object of the present invention to provide an improved voice encoder.

It is yet another object of the present invention to provide an improved voice decoder.

It is yet a further object of the present invention to provide a communication system that may place four voice signals on a standard 25 kHz land mobile radio communication channel.

It is yet another object of the present invention to provide a spectrally efficient and reliable communication system having improved audio quality.

It is yet another object of the present invention to provide a communication system that provides improving audio quality with increasing receive signal strength.

It is yet a further object of the present invention to provide a communication system that degrades gracefully as the received signal strength is reduced.

It is yet another object of the present invention to provide a communication system that is robust to channel induced impairments of the transmitted signal.

It is yet a further object of the present invention to provide a secure spectrally efficient communication system by encrypting a vo-coded information signal.

Accordingly, these and other objects are provided in the present invention

Briefly, according to the invention, an information signal, such as a voice signal, is sampled, quantized, and processed digitally using, for example, a sub-band encoder. Digitally processed samples produced by the sub-band encoder are modulated onto a communication channel to create channel symbols having a magnitude of modulation proportional to a characteristic (preferably the sample magnitude) of a respective digitally processed sample. This technique of channel modulation provides, during periods of high signal strength, a superior estimation of the digitally processed sample at a receiver. This facilitates receiver speech reconstruction thereby providing a higher quality speech signal. As the received signal degrades, the accuracy of the estimates of the digitally processed samples degrades, thus causing the reconstructed speech to degrade gracefully as opposed to total loss of the signal. Viewed in the context of a radio frequency transmission embodiment, the overall effect of the present invention provides robustness to noise corruption, while providing improved spectral efficiency.

In another aspect of the present invention, encryption of the digitally processed samples is provided to ensure communication privacy.

Finally, in another aspect of the present invention, a wireline embodiment provides spectrally efficient communication (including encryption) for standard (uncompensated) narrowband telephone channels (which do not have a low frequency response).

BRIEF DESCRIPTION OF THE DRAWINGS

FIG. 5 is a block diagram of the radio frequency decoder of the present invention;

DETAILED DESCRIPTION OF THE PREFERRED EMBODIMENT

The present invention operates to reduce the occupied transmission bandwidth of information signals such as, for example, voice, video, telemetry or similar signals that contain, or may be adapted to contain, redundant spectral or other unnecessary information. The information signal is sampled, quantized, and digitally processed to produce digitally processed samples. A communication channel is modulated using the digitally processed samples to create channel symbols having a magnitude of modulation proportional to a characteristic of a respective digitally processed sample. According to the invention, the preferred transmitted signal comprises the channel symbols together with overhead data which maybe used to synchronize a receiver and transfer information regarding the proper reconstruction of the information signal. Optionally, the digitally processed samples may be normalized, companded or encrypted to provide a spectrally efficient communication system having superior signal quality during periods of high signal strength, and exhibiting robustness to noise corruption of the transmitted signal.

In the preferred radio frequency (RF) embodiment of the present invention, an information signal is sampled, quantized, and processed digitally to reduce the occupied bandwidth of the information signal thereby permitting up to four such processed signals (which may be encrypted) to be transmitted on a single 25 kHz land mobile communication channel.

In the preferred wire line embodiment, a voice signal is sampled, quantized, digitally processed. However, these digitally processed samples are utilized to create a multi-subcarrier signal which is centered in the available bandwidth of a standard (uncompensated) narrowband telephone channel to provide communications. Multiple symbols are simultaneously transmitted over the channel. Each symbol utilizes a different subcarrier and has a magnitude of modulation proportion to a characteristic of a single digitally processed sample. Overhead data is also modulated using these subcarriers. According to the present invention, encryption may be provided to afford a secure communication channel over standard (uncompensated) telephone lines.

RADIO FREQUENCY ENCODER

Figure 1:
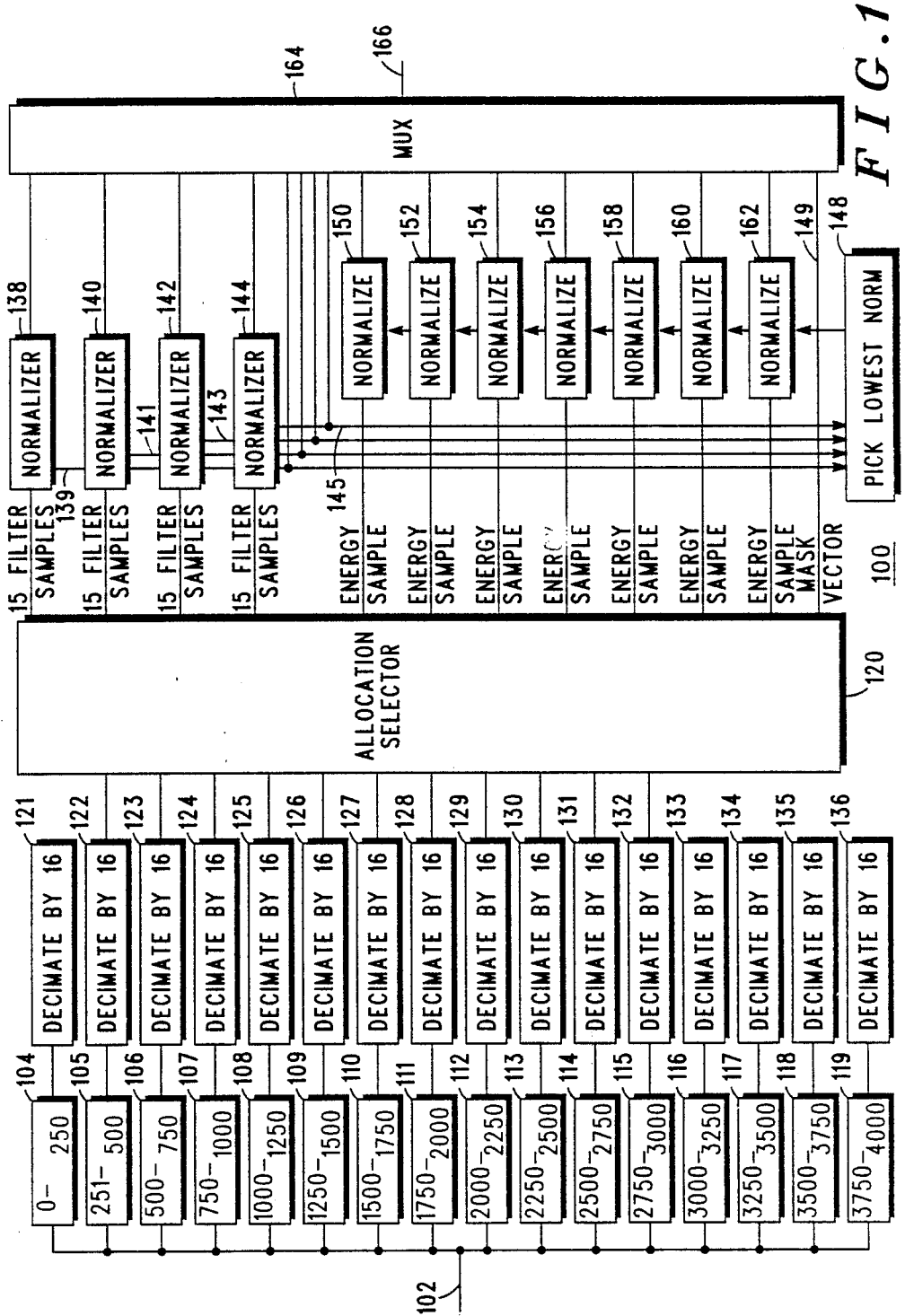
FIG. 1 is a block diagram of the radio frequency encoder of the present invention.

Referring now to FIG. 1, the preferred radio frequency encoder 100 is shown in block diagram form. Operationally, an information signal, such as a voice signal, is sampled and quantized by, for example, an analog-to-digital (A/D) convertor (not shown), which provides a binary representation (preferably via P.C.M. at 8000 samples per second) of the information signal to an input port 102 of the encoder (100). The digitized samples are routed to a plurality of sub-band filters (104–119) each filter having a 250 Hz bandwidth to provide a plurality of "sub-bands" of the information signal. Such filters are well known in the art and preferably comprise polyphase or quadrature mirror filters having anti-aliasing properties among adjacent bands. Accordingly, filter 104 occupies the band from DC to 250 Hz, filter 105 resides in the 250≧500 Hz band, and so on through filter 119, which is situated in the 3750–4000 Hz band.

As shown in FIG. 1, the present state of the art apportions an information signal into sixteen (16) bands. According to the present invention, several filters (104 and 116–119) need not be used if the information signal is a voice signal, since the amount of voice energy residing in the spectrum associated with these filters is small or unnecessary to the proper reproduction (synthesis) of a voice signal at a receiver. For other information signals (for example, video or telemetry), another arrangement of the sixteen filters may be required depending upon the un-processed spectral characteristics of the information signal and the desired recovered signal quality. In any event, the selected filters are coupled to an allocation selector (120) via decimators (121–136). For a vo-coder, filters (105–115) are routed to the allocation selector (120) via decimators (122–132).

The decimators reduce the sampling rate of the digitally filtered samples by a factor of 16. Decimation reduces the power consumption, memory requirement, and eases the computational burden of later stages by slowing the processing rate. Accordingly, the present invention reduces the output sample rate of each filter by a factor of sixteen. Of course, other decimation rates may be selected depending upon a particular implementation.

The allocation selector (120) investigates a predetermined portion (preferably fifteen samples corresponding to 30 ms of speech) of each of the decimated filter outputs to identify a predetermined subset of the filters that have significant energy content. In the preferred embodiment of the present invention, four filters are selected for transmission. The remaining seven non-selected filter bands are investigated to determine an energy value associated with the amount of energy residing in the non-selected bands. Lastly, the allocation selector (120) forms a mask vector (149), which comprises a digital code identifying the four selected filters so that the receiver may properly synthesize the information signal.

The four selected filters each have fifteen samples routed to normalizers (138, 140, 142, and 144), which scale the fifteen samples of each selected filter to reside within some maximum amplitude range. Preferably, each of the normalizers (138, 140, 142 and 144) operate by increasing the amplitude of the samples in 6 dB steps, until it is determined that the next 6 dB increase would exceed a predetermined threshold. This amplification (normalization) factor for each of the four selected filters is routed (139, 141, 143 and 145) to the normalization selector (148). The normalization selector (148) operates to select the lowest normalization factor provided by the normalizers (138, 140, 142 and 144) to scale (normalize) the energy values of the seven non-selected filters. Accordingly, the normalizers (150–162) uniformly scale each energy value provided by the allocation selector (120) in accordance with the lowest normalization factor. The preferred selection of the lowest normalization factor protects against clipping at the transmitter. At the receiver, any noise or other adverse phenomenon that corrupts the energy sample will be attenuated by this normalization factor to reduce the impact. According to the invention, the normalized energy values are not compared to a threshold because the effect of an energy value exceeding the threshold value is generally not detrimental to the recovered speech quality. The reason for this is that the energy values in the non-selected filters are ordinarily quite low (compared to the four selected filters) which, of course, is the reason the non-selected filters were not selected by the allocation selector (120).

The normalized selected filter samples, their normalization factors, the normalized energy values, and the mask vector (149) are all routed to a multiplexer (164). The function of the multiplexer (164) is to arrange these signals into a sub-frame format, that will ultimately be modulated on to an RF communication channel. The preferred arrangement of these signals (FIG. 4a) is provided by the multiplexer (164) at an output port (166) which may be coupled to an analog or digital multilevel modulation device (not shown) for modulation onto an RF communication channel.

Figure 2:
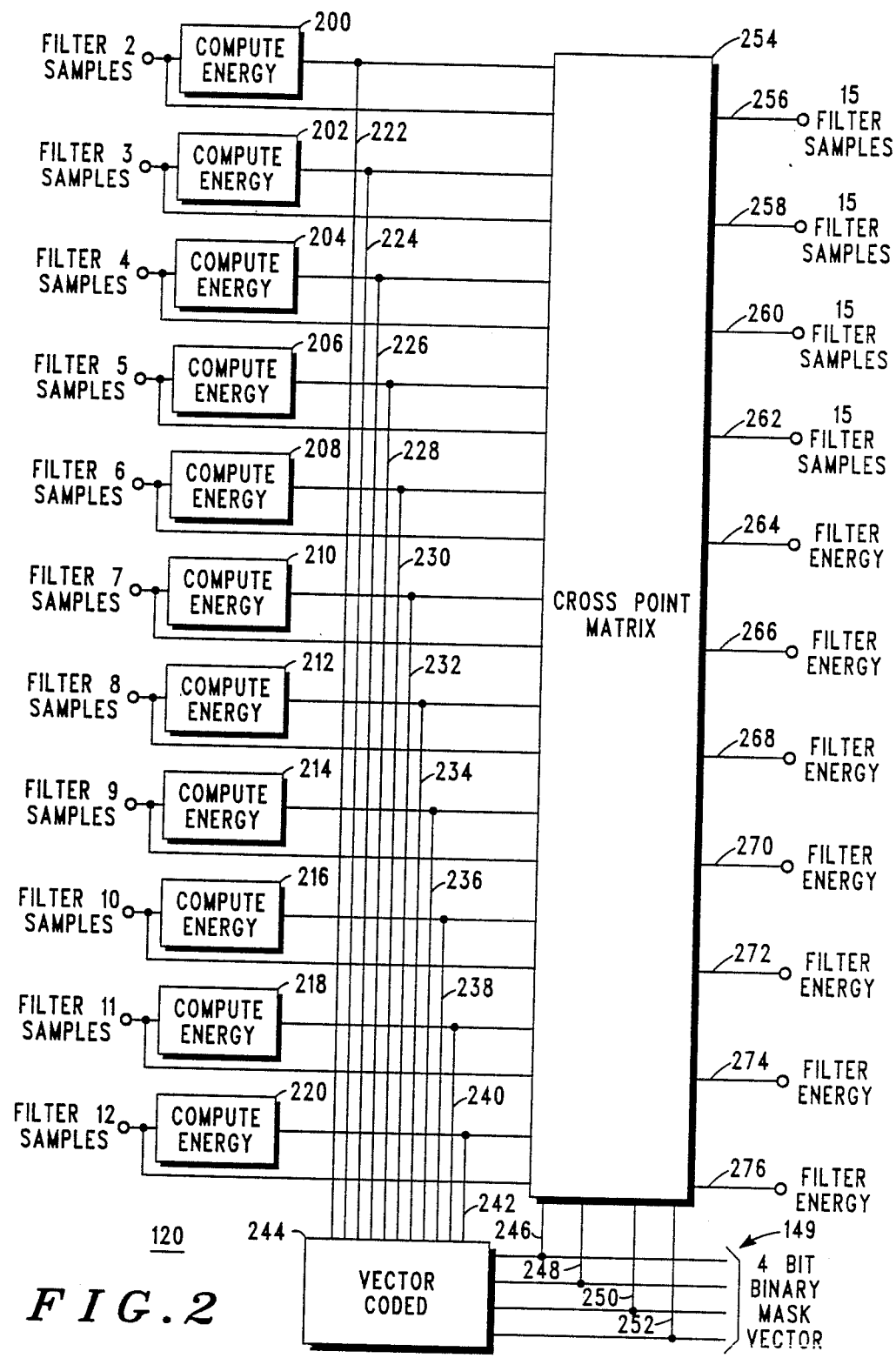
FIG. 2 is a block diagram of the allocation selector of FIG. 1.

Referring now to FIG. 2, a block diagram of the allocation selector (120) of the encoder (100) is shown. The decimated filter samples from filter 2 (105) through filter 12 (115) are received by energy computators (200–220) (recall that filters 1 (104) and 13–16 (116–119) are not used in the preferred vo-coder embodiment of the present invention). The energy computators (200–220) are of conventional design and preferably comprise square-and-sum type devices or an equivalent function performed by a software protocol. Each of the energy computators (200–220) provide a value proportional to the amount of energy in the band associated with their respective filter. These values are coupled (222–242) to a vector coder (244), which operates to provide the four bit binary mask vector (149) that identifies the four selected filters. The mask vector (149) is coupled (246–252) to a cross-point matrix (254), which route the four selected filters (identified by the mask vector) to four corresponding output ports (256–262). Signals representing each of the energy values of the seven non-selected filters (as opposed to the actual filter samples) are routed to other output ports (264–276). In this way, only sample outputs from four filters (albeit normalized) and energy values (also normalized) representing the energy in the non-selected filters are modulated onto a communication channel for transmission.

Figures 3A, 3B:
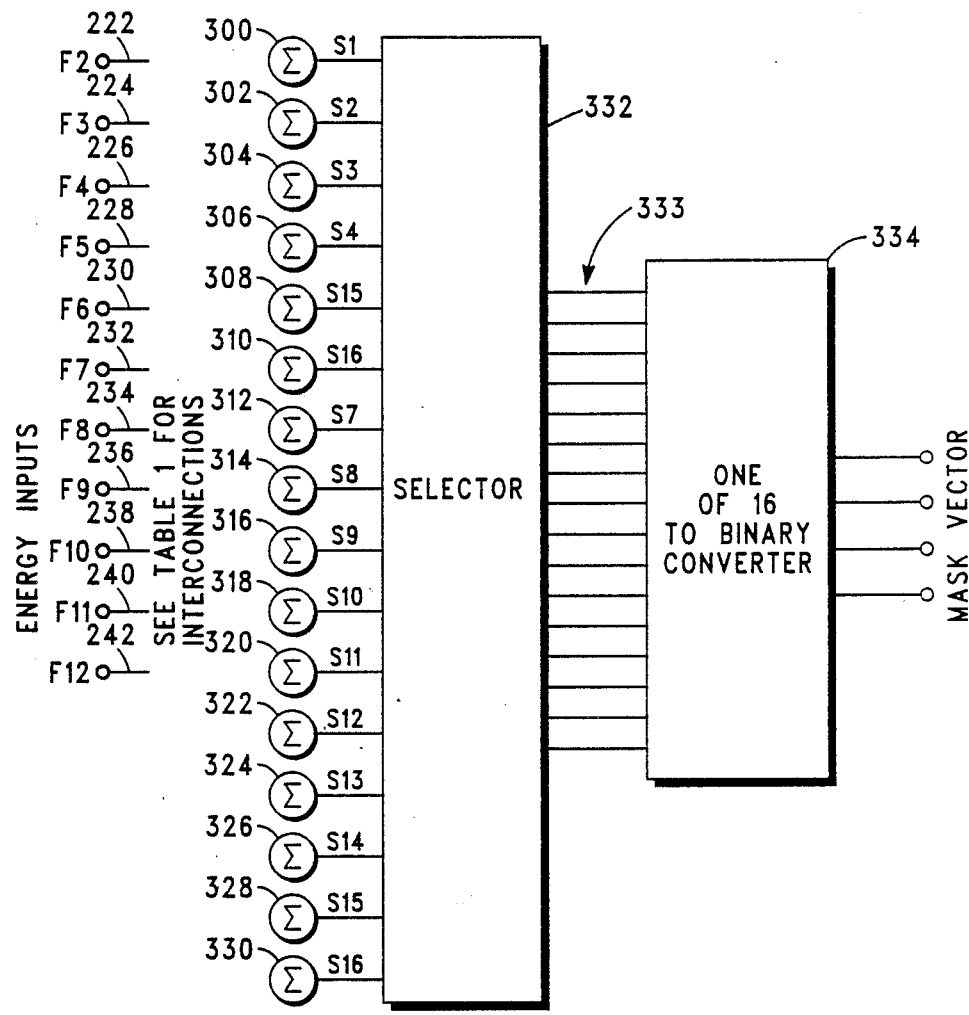
FIG. 3 is a block diagram of the vector coder of FIG. 2.

Referring now to FIG. 3, a block diagram of the vector coder (244) is shown. The energy values (222–242) from the eleven vo-coder filters (F2–F12) are interconnected to 16 summers (300–330) as per Table 1 of FIG. 3 (a "1" indicating a connection). Thus, for example, the energy value (242) of Filter 12 is coupled to summers S10 (318) and S16 (330). The summers (300–330) add the energy values coupled to them, and provide a sum value to a selector (332), which selects the highest sum value from the sixteen sum values. The summer having the highest value will be designated by the selector (332) with a logical one and the remaining summers will be designated with a logical zero (or vice versa). The selector (332) is coupled (333) to a 1-of-16 binary convertor (334), which provides a 4-bit digital code, that indicates the particular one of the 16 summers having the highest summed energy value. The binary number comprising the mask vector (149) may be mapped (per Table 1 of FIG. 3) to identify the four selected filters. Thus, for example, if summer 7 (312) was identified as the summer having the highest sum value, filters 2, 3, 5 and 6 would comprise the selected four filters.

Ordinarily, the selection of any four filters, of eleven independent filters, results in 330 possible combinations of four. Using contemporary information theory, various counting algorithms may be employed to code these 330 possible combinations into 9 digital bits. However, it can be empirically shown that the energy content of a voice signal does not appear randomly across the audible frequency band. That is, all possible combinations of four filters do not occur with equal likelihood. Therefore, the four selected filters are not independent, and it can be shown that given a first filter is selected, there are measurable probabilities that predetermined other filters will have the substantial energy content of the speech signal. The reason for this comprises the realization that for voiced sounds (i.e., vowels) the important spectral information lies only within a few frequently selected filter bands. For unvoiced speech (i.e., consonants) the filter bands containing the predominant energy are not critical since, as will be discussed later, the non-selected filters are "filled" with noise at the receiver to recreate the noiselike unvoiced sounds. Accordingly, it can be shown that a selection of 120 of the 330 possible combinations results in 99% probability of the correct filters being selected. However, this level of optimization is not necessary to have natural sounding reproducible speech.

According to the present invention, by limiting the possible arrangement of four filters to only the sixteen combinations designated by Table 1 of FIG. 3, superior voice quality having the desirable characteristics of speaker identification and natural voice fullness is provided. Moreover, the number of symbols required in the mask vector has been reduced by over 50%; the sixteen possible combinations requiring only four symbols, whereas the full 330 possible combinations would have required 9 symbols. Spectral efficiency is thus enhanced.

Figures 4A, 4B:
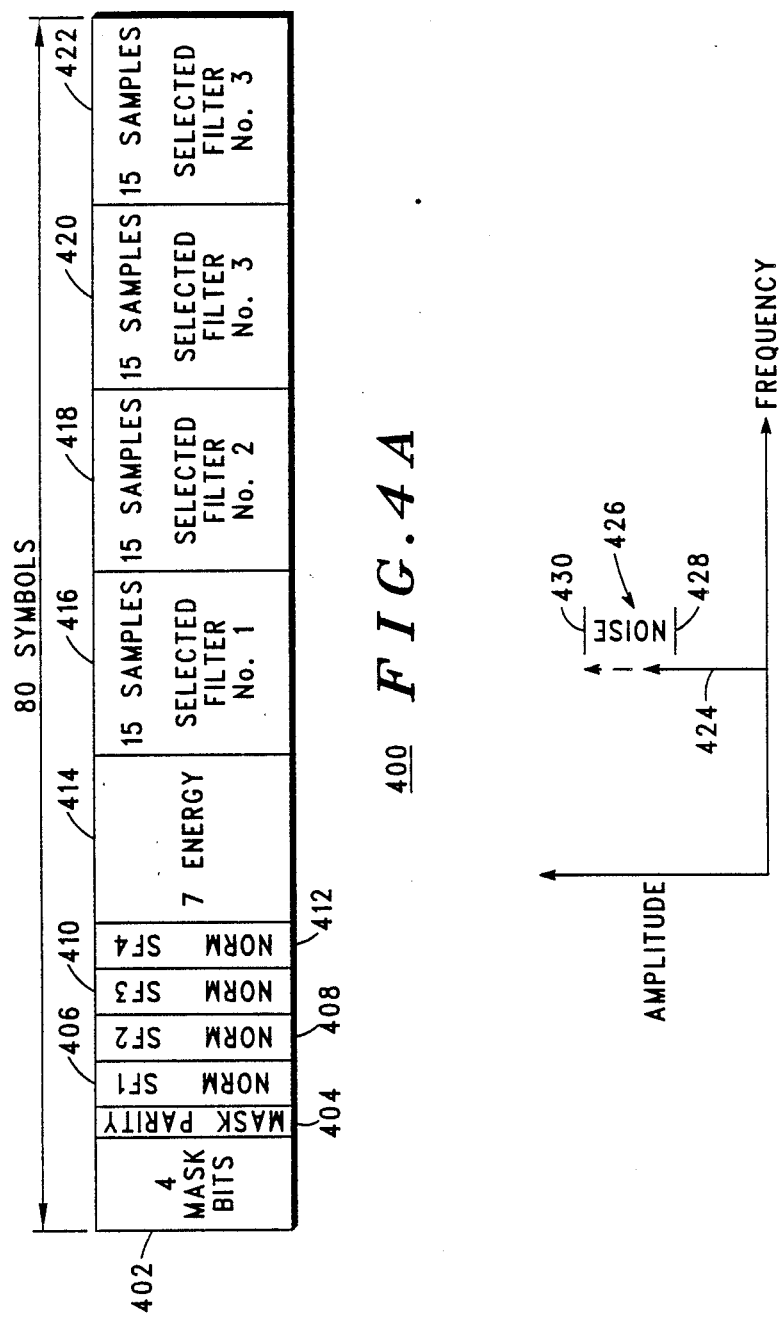
FIG. 4a is an illustration of the preferred sub-frame channel format of the present invention.
FIG. 4b is an illustration of a voice sample and a corrupting noise signal.

Referring now to FIG. 4a, the preferred sub-frame format (400) is shown. The sub-frame format (400) comprises 80 symbols consisting of the 4-bit mask vector generated by the vector coder (244), which is coded with a mask parity bit (404) to provide a method of detecting errors in the mask. Since the mask identifies the four selected filters it is essential that the receiver correctly decode which four filters are to receive the transmitted samples. Following the mask parity bit, the normalization factors for each of the four selected filters provided by the normalizers (138, 140, 142 and 144) are transmitted as two ternary (three level) signals. As is known, two ternary symbols may identify nine different normalization factors. Since, in the preferred embodiment, each normalization step is 6 dB, 54 dB (9×6) of dynamic range is provided. Other arrangements, however, may be used. Accordingly, the normalization value for the first selected filter (SF1) has two ternary signals (406), which is followed by a pair of ternary signals for the filters SF2 (408), SF3 (410), and finally, SF4 (412). Next, the normalized energy values (414) of the non-selected filters are each transmitted as a single symbol (recall that the normalization constant for these energy values need not be transmitted since the receiver will select the lowest of the transmitted normalization values of the selected filters). Following this, fifteen samples from each of the four selected filters (which may be normalized) are transmitted. Together, the binary mask bits, the ternary normalization factors, the symbols for the energy values, and the filter samples comprise the 80 symbol sub-frame format of the present invention.

Referring now to FIG. 4b, an exemplary illustration of a single channel symbol (424) is shown modulated onto a communication channel. Preferably, the sample has been digitally modulated so as to provide an 8-bit (256 level) multi-level signal having a magnitude of modulation proportional to the actual value of the computed normalized filter sample. The sample modulation procedure is used to transmit the magnitude of the normalized computed energy samples. Alternately, the filter samples and energy samples may be modulated onto the communication channel using conventional analog techniques. These procedures have the benefit of encoding more then a single bit of information into a single channel symbol, but avoids the disadvantages commonplace in conventional multi-level data transmission where data decoding in the presence of noise is compromised.

To illustrate the noise immunity provided by the present invention, an exemplary noise signal (426) is assumed to corrupt the channel symbol (424). Depending upon the amplitude and polarity of the noise signal, the corrupted channel symbol may obtain a magnitude as high as the top of the noise range (430) or as low as the bottom of the noise range (428). If the noise perturbation is modest, there may be only a minor effect on the reconstructed speech at the receiver since only an error in the recovered sample proportional to the corrupting noise signal will have occurred. Thus, instead of complicated and extensive error coding so commonplace in conventional coding schemes, the present invention conveys the digitally processed samples to the communication channels as channel symbols such that any corrupting parameters create only a proportional recovered sample error. This provides immunity against noise and other distortions and permits a graceful degradation in received signal quality during adverse transmission conditions. Thus, a receiver operating upon a strong received signal may enjoy superior recovered signal quality since the sample recovered from the channel symbol should be sampled and quantized to provide, ideally, the identical value of the original digitally processed sample at the transmitter. A receiver located near a communication "fringe" area may suffer a noisier recovered signal since the sample obtained from the channel symbol has been corrupted. Further reduction to the effects of noise are obtained by the aforementioned normalization procedure. In effect, any recovered sample errors are scaled in proportion to the normalization factor, which is related to the speech energy. Effective noise masking is thereby realized.

RADIO FREQUENCY DECODER

Referring now to FIG. 5, the radio frequency voice decoder embodiment (500) is shown in block diagram form. Naturally, as is the case with most encoder/decoder arrangements, the general purpose of the decoder (500) is to reverse the coding process provided by the encoder (100). Accordingly, the received symbols comprising the sub-frame information (see FIG. 4a for the preferred sub-frame format) are sampled, quantized, and the binary sample representations are coupled to the input (502) of the decoder (500) for synthesis of the information (voice) signal. Initially, a demultiplexer (504) separates the serially transmitted information into a parallel format comprising the fifteen samples of each of the four selected filters (506-512), their associated normalization factors (514–520), the seven energy samples of the non-selected filters (522–534), and, of course, the mask vector (536), which identifies the four selected filters. All of these signals are received by an allocation decoder (538), that de-normalizes both the filter samples and the energy samples and routes the filter samples to an appropriate receive filter (557–567). Each of the non-selected filters are "filled" with random noise, which is scaled to an appropriate amplitude corresponding to the magnitude of the energy sample to improve the perceived audio quality, thereby avoiding a "hollow" or unnatural sound and masking various artifacts.

The allocation decoder (538) provides each of these signals to an interpolator (541–551), Which increases the sampling rate of the samples by a factor corresponding to the decimation rate at the transmitter (a factor of sixteen in the preferred embodiment). Recall that of the conventional sixteen sub-bands, the first, and thirteenth through sixteenth are not used by the vo-coding embodiment of the present invention Accordingly, interpolators (540) and (552–555) are not required for a voice signal. The up-sampled signals are routed to a bank of digitally implemented sub-band filters (556–571), which correspond in bandwidth and spectral position to the filters (105–115) at the encoder (100). The filter outputs of each of the filters (557–567) are combined to synthesize the voice signal, which is provided at an output port (572) of the decoder (500).

Figure 6:
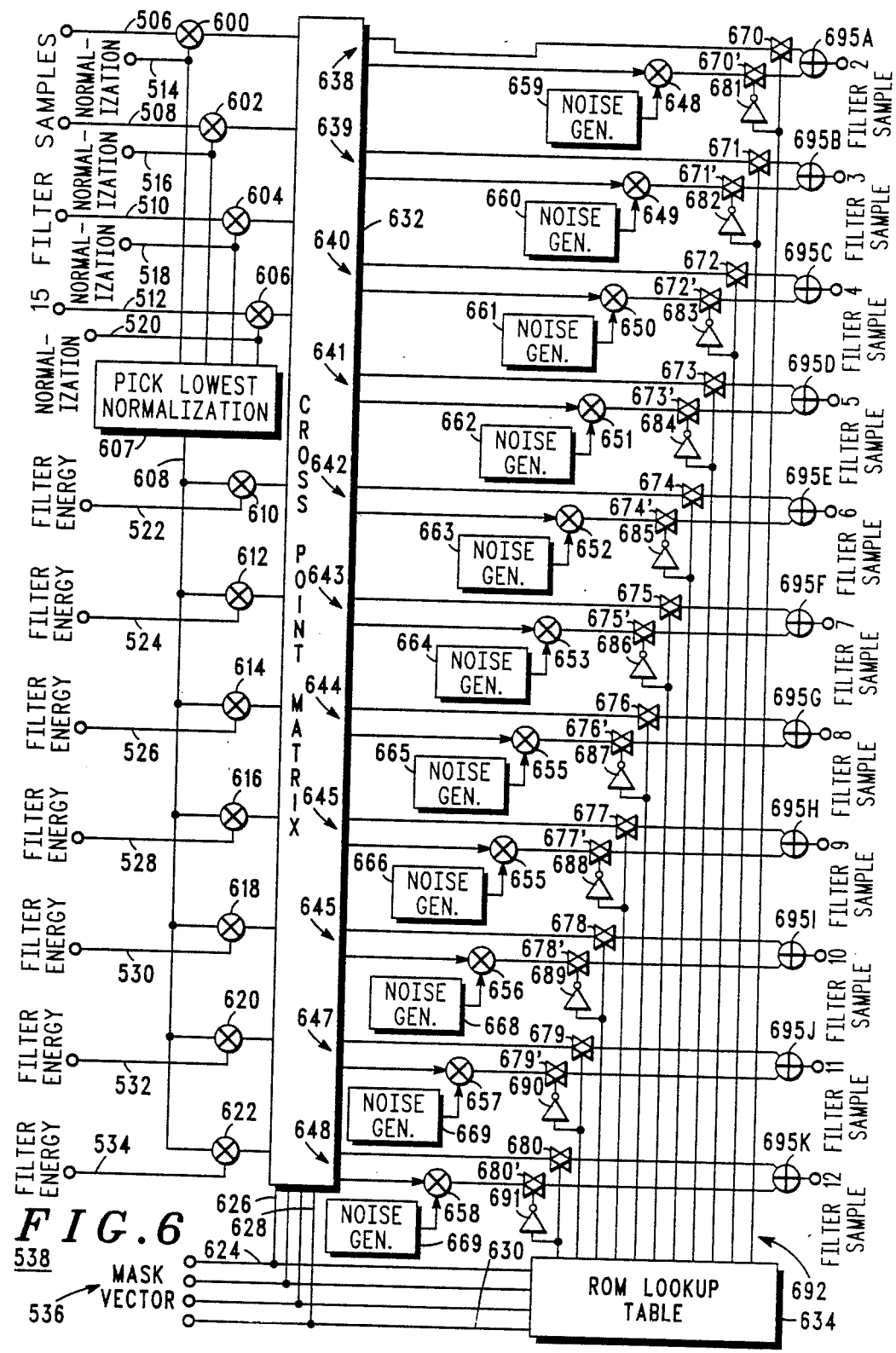
FIG. 6 is a block diagram of the allocation decoder of FIG. 5.

Referring now to FIG. 6, the allocation decoder (538) is shown. The fifteen samples of each of the four selected filters (506–512) are coupled respectively to a denormalizer (600–606), which accepts as a second input the normalization factor (514–520) and operates to scale the samples. Each of the normalization factors (514–512) are also coupled to a selection circuit (607), which selects the lowest normalization factor to scale the 7 non-selected energy samples (522–532) via the denormalizers (610–622). Each of the denormalized samples are coupled to a crosspoint matrix (632) of conventional design. Additionally, the crosspoint matrix (632) receives (624–630) the mask vector (536). The mask vector (536) determines the output arrangement of the four selected filters and the seven non-selected filters to the eleven outputs ports (638–647). Each of the output ports (638–647) comprises an outlet of either the filter samples or the energy samples (depending upon whether the filter was selected or non-selected). Of course, in the case of the selected filters, the filter samples will be provided from the output port of the crosspoint matrix (632), since the energy levels of the selected filters were not transmitted. Conversely, the output ports for the non-selected filters will have the energy samples, but not filter samples.

Each of the energy samples from the output ports (638–647) are coupled to normalizers (648–658) to control the amplitude of random noise supplied by noise generators (659–669). This arrangement provides a scaled noise signal proportional to the magnitude of the energy of non-selected filters. Forcing scaled noise signals through the non-selected filters approximates the noise-like unvoiced sounds (i.e., consonants), which provides a fuller and more recognizable synthesized voice signal. The noise sources (659–669) may be separate noise sources for each of the eleven filters, or they may be a single noise source routed to all of the normalizers (648–658), or random noise may be generated by a suitable software algorithm.

The filter samples and normalized random noise are coupled to transmission gate pairs (670/670'–680/680'). Each of the transmission gates (670'–680') have an associated inverter (681–691), arranged so that each transmission gate pair has a corresponding on/off arrangement. That is, for example, if the transmission gate (670) is on, the transmission gate 670' is off (and vice versa). The transmission gate pairs are controlled by eleven control lines (692), which are provided by a read-only memory (ROM) look-up table. The ROM look-up table (634) maps the four-bit mask vector (536) into the eleven control lines (692) in accordance with Table 1 of FIG. 3. In this way, the filter samples of the four selected filters and the normalized random noise for each of the non-selected filters are routed to summers (695a–k). Since the transmission gate pairs conduct in an alternate arrangement the summers (695a–k) pass either the filter samples or the scaled random noise to the interpolators (541–551) of FIG. 5.

Although the encoder (100) and the decoder (500) (of FIGS. 1 and 5 respectively), have been illustrated for convenience in hardware block diagrams, it will be appreciated by those of ordinary skill in the art that a preferred physical embodiment for these devices may comprise a digital signal processor (DSP) such as, for example, the DSP 56000 manufactured by Motorola, Inc., or its functional equivalent. Accordingly, a further advantage may be afforded by the present invention by using the computational power of the DSP either singularly, or in conjunction with an external microprocessor, to improve the reliability of the speech coding arrangement of the present invention.

As discussed in conjunction with FIG. 4a and 4b, the preferred sub-frame format of the present invention comprises 80 symbols, only one of which represents a parity symbol. According to the present invention, additional error protection or other coding is not provided to the energy symbols or the filter samples. Thus, it is evident that the present invention transmits only the essential information required for the decoder (500) of the present invention. However, a prolonged deep fade may adversely impact the proper reception of the transmitted signal. Accordingly, the present invention contemplates the creation and maintenance of a "history table", which stores information gleaned from several previously received sub-frames. Additionally, this information may have an associated weighting factor, to provide a measure of the confidence of the reliability of that information. Such a weighting factor may be generated, for example, in relation to the received signal strength at the moment of receiving the particular sub-frame. In this way, a history of the received energy symbols and normalization factors may be maintained, and should a marked departure from the established history appear, the decoder (500) may disregard the deviation in favor of the historical values (either singularly or averaged over several of the previous values).

The history table approach afforded by the present invention is viable mainly because each sub-frame represents 30 ms of speech. Those skilled in the voice coding arts will appreciate that speech is a particularly unique signal, and by examination of its characteristics, it can be shown that marked deviations in the speech pattern do not generally occur over short periods of time. In recognition of the characteristics of voice signals, the values stored in the history table, together with the weighted confidence that each of the elements of the history table is correct, the present invention affords a compensation technique without the requirement of additional error correcting or parity symbols. If the particular DSP employed has sufficient resident RAM, the history table may be conveniently stored on-chip. Alternately, however, the DSP may be able to communicate with off-chip RAM, or may receive information provided by a microprocessor or similar control device.

WIRELINE ENCODER

Figure 7:
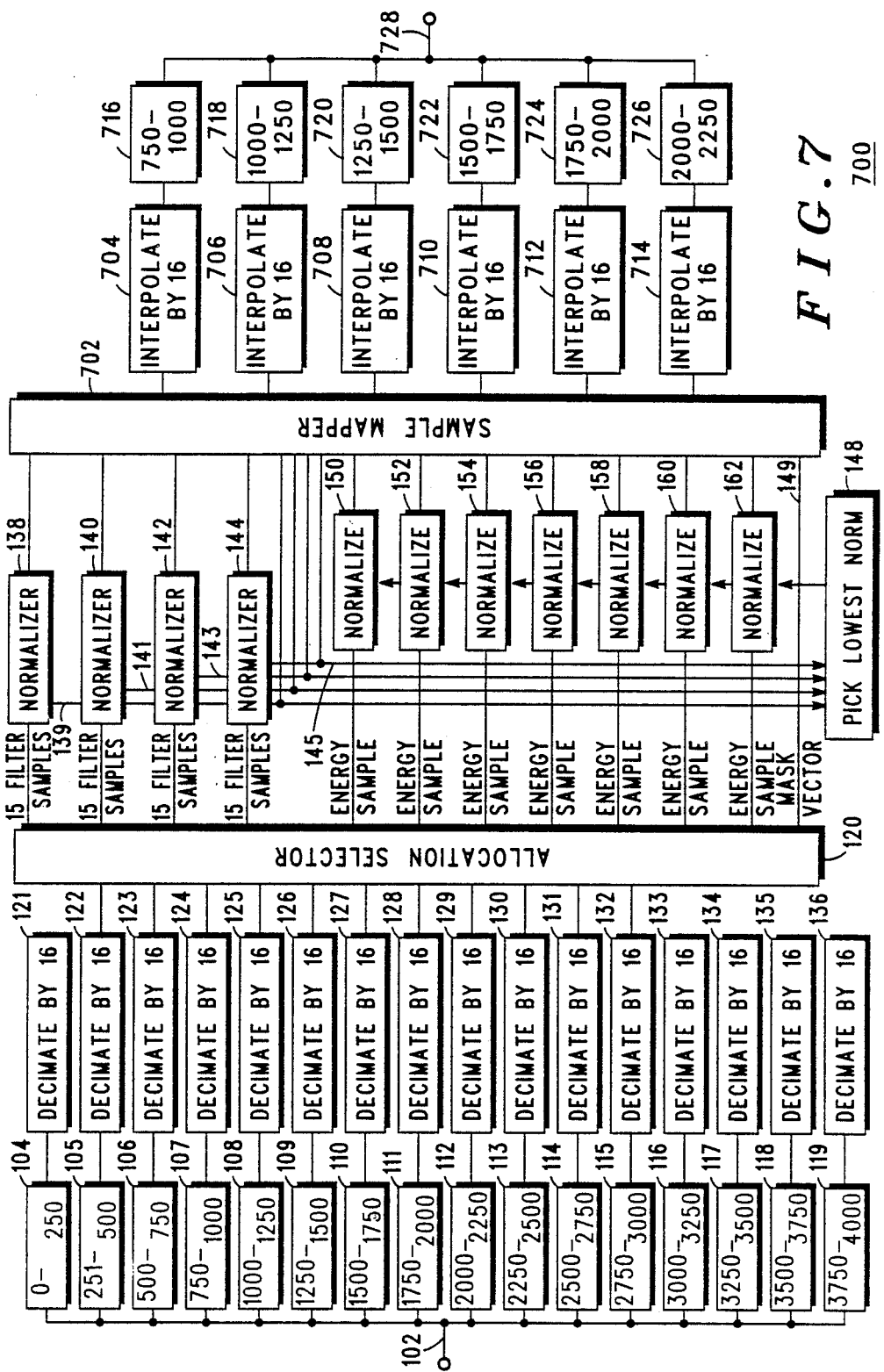
FIG. 7 is a block diagram of the wireline encoder of the present invention.

Referring now to FIG. 7, the wireline encoder (700) of the present invention is shown in block diagram form. The wireline encoder (700) operates similarly to the RF encoder (100) accepting the information signal at its input (102), and providing normalized samples of four selected filters; the normalized energy values of seven non-selected filters; and a mask vector that identifies the filter arrangement. However, in the wireline encoder (700) these signals are provided to a sample mapper (702).

The sample mapper (702) arranges the overhead data and samples for processing by six filters (716–726). Similarly to the digital filters discussed in conjunction with FIG. 1, each of the six digitally implemented filters has a 250 Hz bandwidth; the lowest filter residing at the 750–1000 Hz spectral position, and the highest filter spectrally positioned at 2000–2250 Hz. These filter selections are designed to center the encoded information signal in the available bandwidth of a standard (i.e., uncompensated) telephone line. Of course, other filter selections are possible, however, the described spectral positions are preferred. Between the sample mapper (702) and the filters (716–726) are six interpolators (704–714), which increase the sampling rate of the signals prior to their combination into an output signal (728). The interpolation factor of the interpolators (704–714) is selected to be identical to the decimation factors provided by the decimators (122–132) (the preferred factor being 16).

The above proceed creates six simultaneous sub-carriers each having a magnitude that is modulated in so as to maintain a proportionality to the digitally processed samples. The use of the sub-band filter bank for the generation process allows for the efficient "packing" of the sub-carriers, and minimizes "leakage" of information from one sub-carrier to an adjacent sub-carrier.

In the preferred arrangement, the sample mapper (702) passes the mask vector symbols (402), the mask parity symbol (404), and the ternary normalization symbols (406), (408) and (410) through filter 3 (720). Simultaneously, the ternary normalization factor (412) and the seven energy value symbols (414) are passed through filter 4 (722). Concurrently, the fifteen samples of selected filter 1 (416) are routed through the second filter (718); the fifteen samples of selected filter 2 (418) are routed through filter 5 (724); the fifteen samples of selected filter 3 (420) are routed through filter 1 (716); and, the samples of filter 4 (422) are routed through filter 6 (726). Also, a synchronization symbol is passed through each of the filters (716–726) to spread the synchronization pattern (which may also be used to equalize the channel) across the six filters. Of course, other arrangements of these samples and symbols are possible; the only requirement being that the decoding sample mapper (828) perform the inverse arrangement as the encoding sample mapper (702) to allow for the proper recovery.

WIRELINE DECODER

Figure 8:
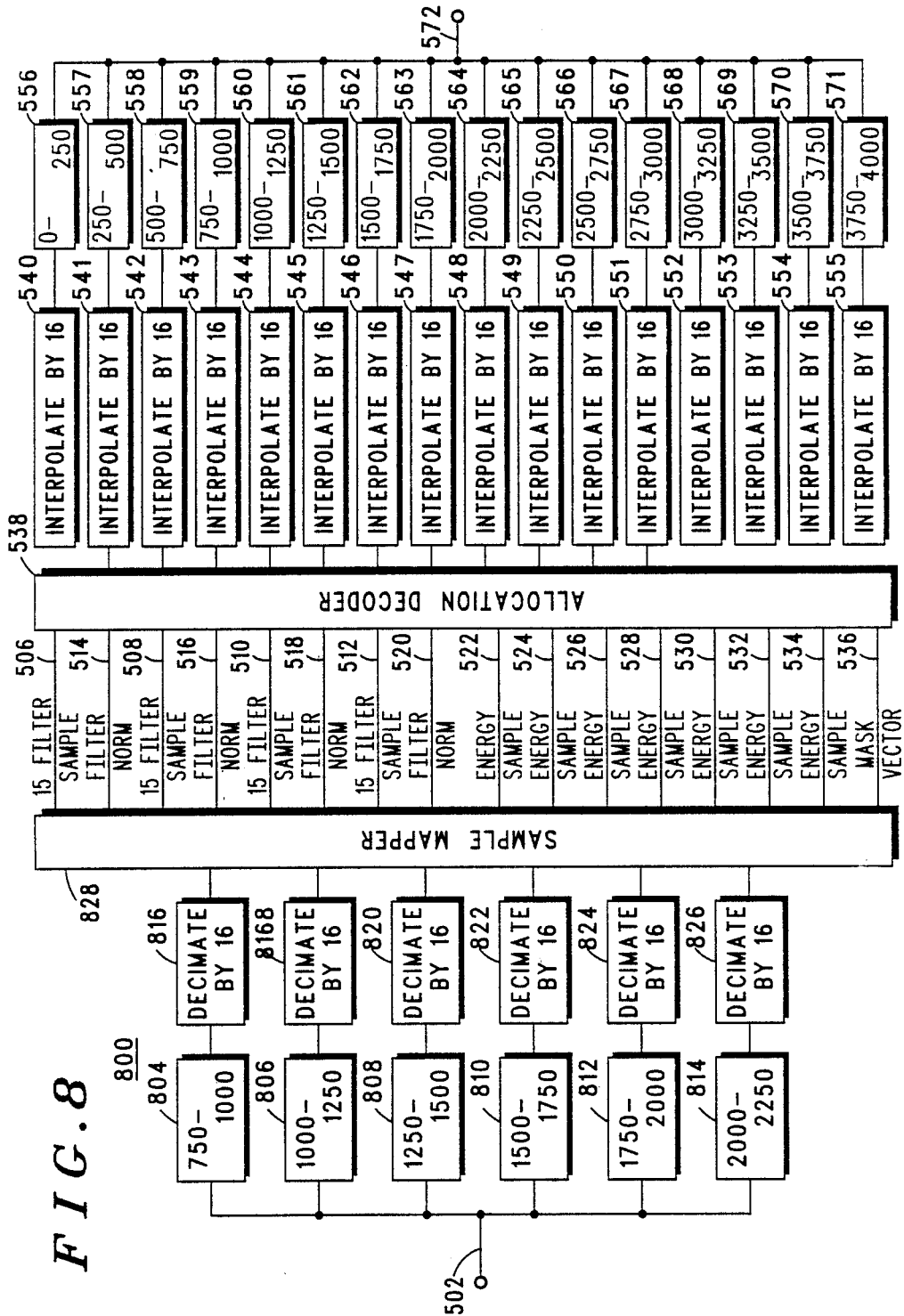
FIG. 8 is a block diagram of the wireline decoder of the present invention.

Referring now to FIG. 8, the wireline decoder (800) of the present invention is illustrated in block diagram form. The received information, which was formatted according to the sample mapper (702) of FIG. 7, is sampled, quantized, and routed to the wireline decoder (800) at its input port (802). The input port (802) couples the received information to six digitally implemented filters (804–814), which, in turn, are coupled to decimators (816–826). The filters (804–814) correspond in bandwidth and spectral position to the filters (716–726) of the encoder (700), and the decimators (816–826) decimate at a rate equivalent to the interpolation rate of the transmitter (a factor of sixteen of the preferred embodiment). Of course, suitable equalization and frame and symbol synchronization must be accomplished before or after the filtering process.

The sub-band filtered and decimated information is provided to a sample mapper (828), which provides the inverse allocation function of the sample mapper (702). Thus, the fifteen filter samples of the four selected filters (506–512), their associated normalization factors (514–520), the normalized energy samples of the seven non-selected filters (522–534), and the mask vector (536) are routed to the allocation decoder (538). From this point, the wireline decoder (800) operates similarly to the RF decoder (500) described in conjunction with FIG. 5. The synthesized voice signal is provided at an output port (572).

As described for the RF encoder (100) and decoder (500), the preferred physical arrangement for the wire line encoder (700) and decoder (800) comprises a digital signal processor (DSP) such as, for example, the Motorola DSP 56000. In this way, the "history table" compensation arrangement, which disregards marked deviations from previously received levels of particular information, may be used to enhance the proper reception of the received wire line signal.

Of course, since the bandwidth of an uncompensated telephone channel is so narrow, only one information signal may be transmitted at a time. However, the true improvement in the wireline case is provided when encryption is provided to ensure voice privacy. According to the present invention, once a voice signal has been vo-coded as described in conjunction with FIG. 7, encryption of both the overhead data and samples may be provided (as more fully discussed hereinafter) to ensure complete voice security within the bandwidth currently available on standard (uncompensated) telephone channels. Conventional wireline digital encryption techniques generally require high complexity modems, specially compensated telephone lines, and/or the use of very low bit-rate speech coders, which provide poor speech reconstruction. This places severe restrictions on the availability of voice privacy to the telephone market. According to the present invention, voice privacy may be readily provided without the penalty of specially compensated telephone lines.

RADIO FREQUENCY COMMUNICATION SYSTEM

Figure 9:
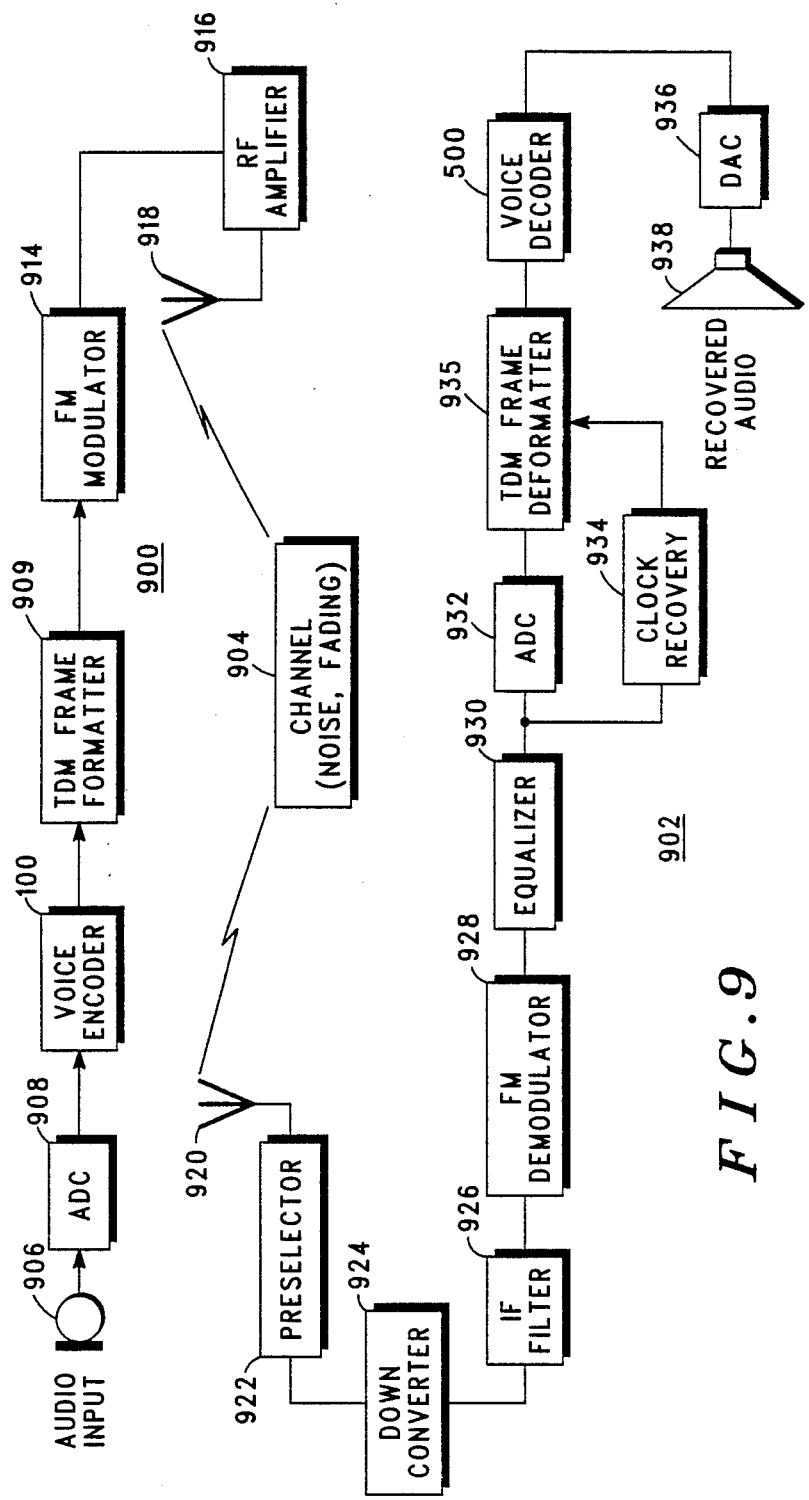
FIG. 9 is a block diagram of a radio frequency transmitter and receiver employing the encoder of FIG. 1 and the decoder of FIG. 5.

Referring now to FIG. 9, a radio frequency transmitter (900) communicates with a radio frequency receiver (902) over a non-ideal radio frequency communication channel (904). The communication channel (904) is considered non-ideal in that noise corruption, signal fading and other adverse phenomena are considered to be continually operating in varying degrees on the transmitted signal.

At the transmitter, a voice signal is applied to a microphone (906), which is coupled to an A/D convertor that samples and digitizes the voice signal. The quantized voice signal samples are applied to the voice encoder (100), which operates as described in conjunction with FIG. 1. The voice encoder (100) provides information formatted in accordance with the preferred subframe format (FIG. 4a) to a time division multiplex (TDM) frame formatter (909). The frame formatter (909) arranges the sub-frames into the preferred frame (channel) format to be hereinafter more fully described. The TDM frames are applied to a frequency modulator (914) (which preferably includes suitable filtering to minimize the occupied bandwidth), which converts the digitally processed (and filtered) samples into frequency modulated channel symbols. According to the invention, any other type of multi-level digital or analog modulation may be used, including: amplitude modulation, phase modulation, or amplitude or angle sub-carrier modulation. Following this, the resultant signal is amplified (916) and applied to an antenna (918) for transmission over the non-ideal communication channel (904).

At the receiver, an antenna 920 directs the transmitted information to a preselector (922), which appropriately bandlimits the frequency spectrum available to the receiver (902). The filtered received information from the preselector (922) is removed from the RF carrier by the down convertor (924) to a suitable intermediate frequency (IF). An IF filter (926) further bandlimits the received signal, which is demodulated by a suitable FM demodulator (928). Next, the information is equalized in an equalizer (930), which operates to correct delays and other corruptions of the transmitted information caused by filtering within the modulator (914), IF filtering, and other known delays in the communication system. The now equalized TDM frame is applied to an A/D convertor (932), which converts the received symbols into binary form that they may be processed digitally using digital signal processors (DSPs). Some or all of the equalization may be performed digitally within the DSP after digitization of the channel symbols. Of course, a suitable clock signal must be recovered (934) and provided to the TDM frame deformatter, which parses out the sub-frames to be applied to the voice decoder (500). The voice decoder (500) operates as described in conjunction with FIG. 5, and provides a synthesized voice signal to the D/A convertor (936). The synthesized voice signal is then applied to a speaker (938) to complete the recovery process.

RF CHANNEL PROTOCOL

Figure 10:
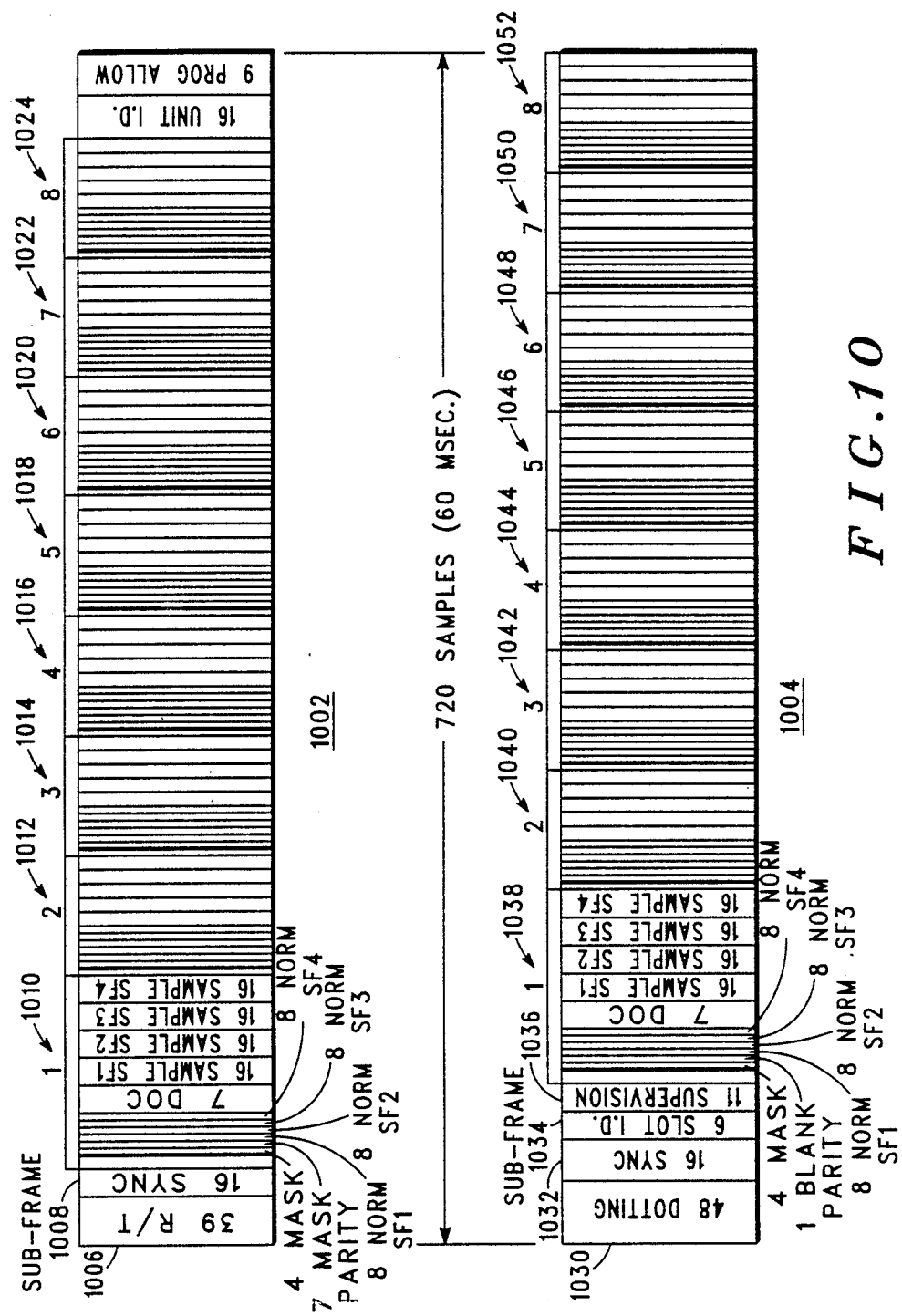
FIG. 10 is an illustration of the preferred inbound-to-repeater and outbound-to-mobile time-division-multiplex RF channel protocols.

Referring now to FIG. 10, the preferred inbound (i.e., mobile to repeater), and outbound (i.e., repeater to mobile) radio frequency channel protocol is shown. As can be seen by FIG. 10, a preferred TDM slot comprises eight sub-frames of FIG. 4a. Each frame comprises four slots. Accordingly, four voice messages may simultaneously reside on a single RF land mobile communication channel having conventional 25 kHz channel spacings. Thus, three other TDM slots follow the illustrated single slot in FIG. 10.

The inbound channel protocol (1002) begins with a "guard time" equivalent in length to 39 symbols. The guard time comprises the receive-to-transmit (R/T) time required to allow the synthesizer of the transmitter to change frequencies and stabilize, and to allow the power amplifier to energize. The R/T portion (1006) precedes a synchronization pattern (1008), which preferably comprises a sixteen symbol synchronization word that marks the beginning of the slot. Following the synchronization word (1008), the eight information sub-frames (1010-1024) are transmitted. Next, a sixteen symbol identification code (1026) is transmitted, which identifies the sending party. Finally, a nine symbol propagation allowance (1028) is provided after each TDM slot that allows for variations in transmission delay times (as seen by the repeater) from a close-in and far-out transmitting mobile unit. As previously mentioned, following the first slot (1002), three identical slots immediately follow thus accommodating four voices per channel.

The four slots may comprise two full-duplex conversations, four dispatch conversations, or any combination of one full-duplex and two dispatch conversations. These allocations may be dynamically varied either by request of the transmitting mobile; automatically based upon system loading; or on a periodic basis determined by, for example, the time of day. Of course, a data message may be transmitted during one or more slots in place of a voice message on a mixed voice/data communication system.

The outbound channel protocol (1004), begins with 48 symbols of a dotting pattern. (The dotting pattern is the conventional 1-0-1 (etc.) pattern that is customarily transmitted to enable receiving mobiles to obtain bit synchronization.) Following the dotting pattern (1030), a sixteen symbol synchronization word (1032) is transmitted to provide a synchronization marker to the receiving mobiles. Following the synchronization word (1032), a five symbol slot ID (1034) is transmitted, after which an eleven symbol supervisory word (1036) is transmitted. The five symbol slot ID (1034) identifies the following slot so that the receiving mobiles may keep track of which slot is being transmitted. The eleven supervisory symbols (1036) control slot assignments and allocations to implement, for example, full-duplex conversations, dispatch conversations, data messages and to vary other parameters pertinent to the control of communication over the radio frequency channels. Following this supervisory information, the eight sub-frames (1038-1052), which comprise a single outbound TDM slot are transmitted. As previously mentioned, four TDM slots per frame are possible permitting a four to one spectral improvement over conventional communication systems.

ENCRYPTION

Figure 11A:
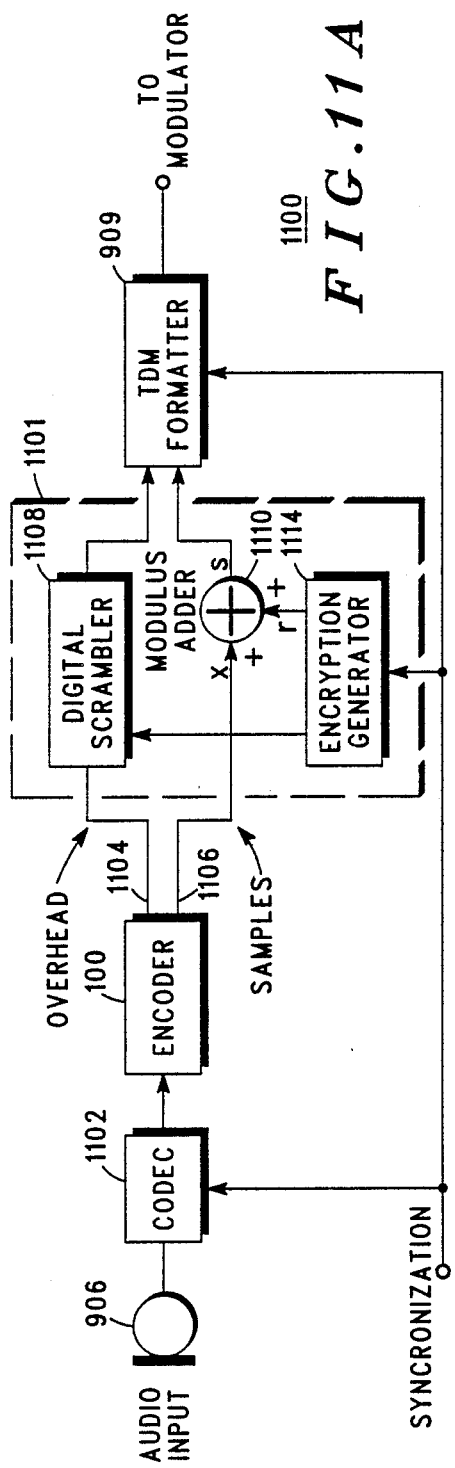
FIG. 11a is a block diagram of a radio frequency transmitter employing encryption according to the present invention.

Referring now to FIG. 11a, a secure transmitter encryption arrangement (1101) is shown applied to a portion of the transmitter (902) of FIG. 9, wherein a voice signal impressed upon a microphone (906), which converts the acoustic energy into electrical signals that are sampled by a codec (1102). The codec digitizes the voice signal, which is routed to the encoder (100), which generates the sub-frame formats as discussed in conjunction with FIGS. 1-4a. However, the data overhead portion (402-412) of the sub-frame format is routed (1104) to a digital scrambler (1108). The digital scrambler (110s) may be of conventional design and may encrypt the overhead information using any proprietary encryption algorithm, or may utilize the data encryption standard (DES) promulgated by the United States National Bureau of Standards. The quantized energy samples (414) and the fifteen quantized filter samples of each of these selected filters (416–422) are routed (1106) to a modulus adder (1110). As a second input, the modulus adder (1110) accepts a quantized encryption vector (denoted r) (1112), which is added to a quantized filter sample (denoted x) to provide an encrypted quantized sample (denoted s). The encryption technique employing a randomly generated quantized encryption vector, which is modulo added to a quantized information sample, is commonly referred to as "sample masking". Such techniques have been described by Cox et al., "The Analog Voice Privacy System", ICASSP, pp 341–344, 1986, and Cosentino et al., "An Efficient Technique For Sample Masked Voice Transmission", IEEE J. on Selected Areas in Comm., Vol. SAC-2, No. 3, May 1984.

According to the encryption arrangement of the present invention the digital encrypted overhead and the "sample masked" quantized energy and filter samples are provided to the TDM formatter (909), which operates to arrange a TDM slot (see FIG. 10). The formatted slot information is routed to any suitable modulator as discussed in conjunction with the modulator (914) of FIG. 9.

Figure 11B:
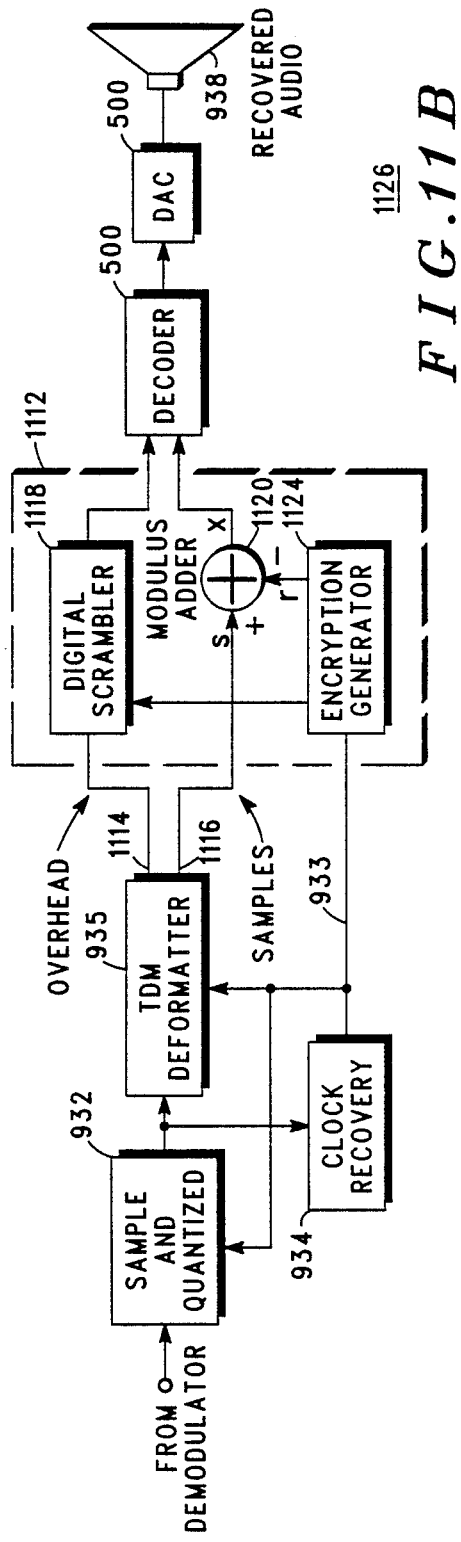
FIG. 11b is a block diagram of a radio frequency receiver employing encryption according to the present invention.

Referring now to FIG. 11b, a secure receiver (1126) comprises an encryption arrangement (1112) applied to a portion of the receiver (904). The recovered TDM frames are sampled and quantized (932) and passed to a clock recovery circuit (934) that provides a clock signal (933) to facilitate recovery. The sampled and quantized TDM frames are also applied to the TDM frame deformatter (935), which routes the sub-frames to the decryption device (1112). Decryption is accomplished in a similar manner to the encryption described in conjunction with the FIG. 11a, by routing (1114) the digital overhead portion of the sub-frame to a digital descrambler (1118). Of course, suitable synchronization must be employed to ensure the encryption generators at the transmitter (1114) and receiver (1124) operate synchronously. The sample masked voice and energy samples are routed (1116) to a modulus adder (1120), which recovers the original sample (denoted x) by subtracting the mask vector (denoted r) (1122) from the encrypted vector (denoted s). The encryption generator (1124) is substantially similar to the encryption generator (1114) providing identical mask vectors (r) to be added and subtracted to the sample vectors. The decrypted overhead and sample portions are provided to the decoder (500), which digitally processes the samples to reconstruct the voice signal. After D/A conversion (936), the reconstructed voice signal is applied to a speaker (938) to complete the recovery process.

Figure 12A:
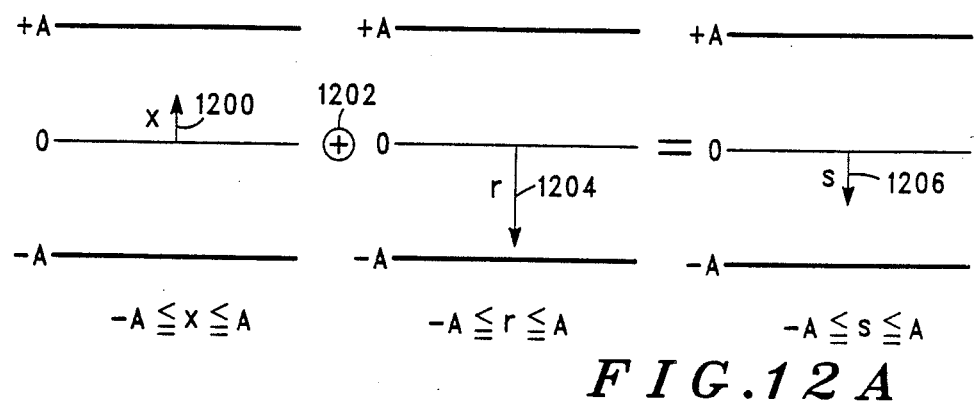
FIGS. 12a–d are illustrations of the preferred encryption technique of the present invention.

Referring now to FIG. 12a, the fundamental operation of the sample mask technique is illustrated. Initially, an 8-bit multi-level sample (1200) resides between two threshold limits (+A and −A). The threshold limits may conveniently be set to be the same as the limits for normalization (discussed in conjunction with FIG. 1) to ensure optimized dynamic range. The 256 level sample (x) (1200) is added (1202) to an 8-bit mask vector (r) (1204). The mask vector (1204) is of random polarity and magnitude. In this example, the sum equals the 8-bit multi-level sample masked vector (s) (1206), which is the encrypted sample to be transmitted.

Figure 12B:
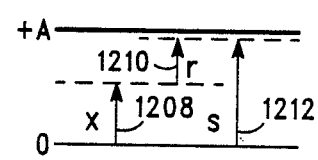

In FIG. 12b, another example of sample masking is illustrated. The 8-bit sample (x) (1208) is added to the 8-bit mask vector (r) (1210) to provide an 8-bit sample masked vector (s) (1212) that resides within the thresholds. Accordingly, no further operations are required and the sample masked vector (s) may be transmitted.

Figure 12C:
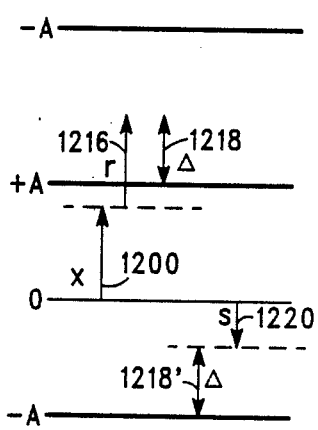

However, in FIG. 12c, the 8-bit sample (x) (1214), when added to the 8-bit mask vector (r) (1216) exceeds the upper threshold (+A) by an amount Delta (Δ) (1218). Accordingly, since the upper threshold has been exceeded the encrypted sample "wraps around" through the lower threshold (−A) by the same amount Delta (Δ) (1218') and the sample masked vector (1220) is constructed by setting the 8-bit sign and amplitude of the vector (s) to meet the upper portion of the range identified by (1218'). Those skilled in the art will appreciate that the "wrap around" process is simply a characteristic of modulo addition.

Figure 12D:
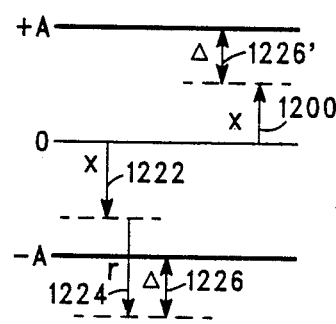

In FIG. 12d, the 8-bit sample x (1222) when added to the 8-bit mask (r) (1224) exceeds the lower threshold (−A) by an amount Delta (Δ) (1226). Accordingly, this sample "wraps around" the upper threshold (+A) by the same amount Delta (Δ) (1226') and the 8-bit sample masked vector (s) (1228) is arranged to meet the amount of lowered threshold excess.

In this way, the quantized energy and filter samples may be effectively masked to provide voice security comparable to the security provided by conventional binary encryption systems. Those skilled in the art will appreciate that while the encryption devices (1101 and 1112) were discussed in conjunction with the RF encoder (100) and decoder (500), encryption may be readily provided to the wireline encoder (700) and the wireline decoder (800) by disposing the encryption device (1101) and decryption device (1112), before the sample mapper (702) and after the sample mapper (828), respectively, to provide complete voice security over standard (i.e., uncompensated) telephone lines.

What is claimed is:

1. A method for transmitting an information signal over a communication channel without use of extensive error coding, comprising the steps of:
   (a) sampling and quantizing at least a portion of the information signal to provide a plurality of digitally coded samples;
   (b) processing at least a portion of said digitally coded samples to provide a plurality of digitally processed samples, wherein each of the digitally processed samples corresponds to a respective one of the digitally coded samples;
   (c) modulating a communication channel using at least some of said digitally processed samples to provide channel symbols, such that each channel symbol has a magnitude of modulation proportional to a characteristic of a respective digitally processed sample, such that received signal quality at a receiver of each channel symbol, and hence each digitally processed sample, will gracefully degrade during adverse transmission conditions.

2. A method for encoding an information signal, comprising the steps of:
   (a) sampling and quantizing at least a portion of an information signal to provide a plurality of digitally coded samples;
   (b) processing at least a portion of said digitally coded samples to provide a plurality of digitally processed samples, wherein each of the digitally processed samples corresponds to a respective one of the digitally coded samples;
   (c) determining an energy value for each of said processed samples;

(d) examining said energy values and determining a plurality of subsets of the digitally processed samples for transmission, wherein each of the subsets corresponds to a respective one of the digitally coded samples, and also selecting at least a portion of said energy values for transmission;

(e) modulating a communication channel using at least some of said subset of processed samples and at least some of said selected energy values to provide channel symbols, each channel symbol having a magnitude of modulation proportional to at least one characteristic of a respective digitally processed sample or energy value, such that received signal quality at a receiver of each channel symbol, and hence each digitally processed sample, will gracefully degrade during adverse transmission conditions.

3. A method for reconstructing an information signal representing an actual information signal from a transmitted signal, comprising:

channel symbols having a magnitude of modulation proportional to at least one characteristic of processed samples or energy values;

said method comprising the steps of:
(a) a receiving the transmitted signal and providing recovered processed samples and recovered energy values;
(b) generating, for each recovered energy value, a background signal having an amplitude respectively related to said recovered energy value;
(c) operating on said recovered processed samples to provide digitally coded samples;
(d) combining said digitally coded samples and said background signals to provide a combined signal;
(e) digital-to-analog converting said combined signal to provide the reconstructed information signal.

4. A method for communicating an information signal, comprising:

at a transmitter, the steps of:
(a) sampling and quantizing at least a portion of an information signal to provide digitally coded samples;
(b) processing at least a portion of said digitally coded samples to provide processed samples;
(c) determining an energy value for each of said processed samples;
(d) examining said energy values and determining a subset of processed samples for transmission, and also selecting at least a portion of said energy values for transmission;
(e) modulating a communication channel using at least some of said subset of processed samples and at least some of said selected energy values to provide channel symbols, each channel symbol having a magnitude of modulation proportional to at least one characteristic of a respective processed sample or energy value;

at a receiver, the steps of:
(a) a receiving said channel symbols and providing recovered processed samples and recovered energy values;
(b) generating, for each recovered energy value, a background signal having an amplitude respectively related to said recovered energy value;
(c) operating on said recovered processed samples to provide digitally coded samples;
(d) combining said digitally coded samples and said background signals to provide a combined signal;
(e) digital-to-analog converting said combined signal to provide the reconstructed information signal.

5. The method of claims 1 or 2 or 4, wherein said modulating step comprises: modulating a radio frequency communication channel using at least some of said subset of processed samples and at least some of said selected energy values to provide said channel symbols, each of said channel symbols having a magnitude of modulation proportional to at least one characteristic of said respective processed sample or energy value.

6. The method of claims 1 or 2 or 4, wherein said modulating step comprises: modulating a wireline communication channel using at least some of said subset of processed samples and at least some of said selected energy values to provide said channel symbols, each of said channel symbols having a magnitude of modulation proportional to at least one characteristic of said respective processed sample or energy value.

7. The method of claim 2 or 4, which includes the transmitter step of: (d1) arranging at least some of said subset of processed samples and at least some of said selected energy values in accordance with a communication protocol.

8. The method of claims 3 or 4, which includes the receiver step of: (c1) filtering said digitally coded samples and said background signals.

9. The method of claims 3 or 4, wherein said receiving step comprises: receiving said channel symbols from a radio frequency communication channel, and providing said recovered processed samples and said recovered energy values.

10. The method of claims 3 or 4, wherein said receiving step comprises: receiving said channel symbols from a wireline communication channel, and providing said recovered processed samples and said recovered energy values.

11. The method of claims 1 or 2 or 4, which includes the transmitter step of: (d1) encrypting at least some of said subset of processed samples and at least some of said selected energy values to provide encrypted samples.

12. The method of claim 11, wherein said encrypting step comprises the steps of:
(i) generating a masking sample for each processed sample to be encrypted;
(ii) combing, respectively, said masking sample and said subset of processed samples to provide said encrypted samples.

13. The method of claims 3 or 4, wherein said receiving step comprises: receiving and decrypting said channel symbols to provide said recovered processed samples and said recovered energy values.

14. The method of claim 13, wherein said decrypting step comprises the steps of:
(i) generating a masking sample for each encrypted sample to be decrypted;
(ii) combing, respectively, said masking sample and said encrypted samples to provide said recovered processed samples and said recovered energy values.

15. The method of claims 3 or 4, wherein said generating step comprises: generating, for each recovered energy value, a noise signal having an amplitude respectively related to said recovered energy value;

16. The method of claims 1 or 2 or 3, wherein said processing step comprises: sub-band coding at least a portion of said digitally coded samples to provide said processed samples.

17. The method of claims 3 or 4, which includes the receiver steps of:
   (i) storing at least a portion of at least some previously received signals to provide previously received information;
   (ii) examining currently received signals and said previously received information to provide an indication signal;
   (iii) operating, in response to said indication signal, to ignore at least a portion of said currently received signal and processing at least a portion of said previously received information.

18. The method of claims 1 or 2 or 4, which includes the transmitter step of: (d1) normalizing at least some of said subset of processed samples and at least some of said selected energy values to provide normalized samples.

19. The method of claims 3 or 4, wherein said receiving step comprises: receiving and denormalizing said channel symbols to provide said recovered processed samples and said recovered energy values.

20. The method of claims 1 or 2 or 4, which includes the transmitter step of: (d1) generating a code identifying which processed samples comprise said subset of processed samples.

* * * * *